CRYOGENIC REFRIGERATOR ADAPTED TO MINIATURIZATION

Original Filed April 3, 1967

Kenneth W. Cowans,
INVENTOR.
BY
Neil J. Dronsall
ATTORNEY.

United States Patent Office

Re. 27,338
Reissued Apr. 11, 1972

27,338
CRYOGENIC REFRIGERATOR ADAPTED TO MINIATURIZATION

Kenneth W. Cowans, Los Angeles, Calif., assignor to Hughes Aircraft Company, Culver City, Calif.

Original No. 3,423,948, dated Jan. 28, 1969, Ser. No. 627,984, Apr. 3, 1967. Application for reissue May 18, 1970, Ser. No. 48,755
Int. Cl. F25b *9/00*
U.S. Cl. 62—6 6 Claims

Matter enclosed in heavy brackets [ ] appears in the original patent but forms no part of this reissue specification; matter printed in italics indicates the additions made by reissue.

ABSTRACT OF THE DISCLOSURE

The structure is a cryogenic refrigerator producing a low-level temperature by closed cycle circulation of a cryogenic fluid. A totally sealed housing is provided which defines a hot cylinder, cold cylinder, and crankcase chamber, the latter having a crankshaft rotatably mounted therein and directly connected to displacers in the cold and hot cylinders. The crankcase chamber which communicates directly with the cold and hot cylinders serves as a reservoir through which the crogenic fluid is cycled during refrigerator operation. The direct rod connections, crankshaft to displacers, eliminate the need for cylinder-defining walls and the related seals and bearing guide arrangements. Motive power is provided by stator windings externally of the sealed housing which operatively cooperate with a rotor journalled internally of the housing and associated with the crankshaft.

Figure 1:
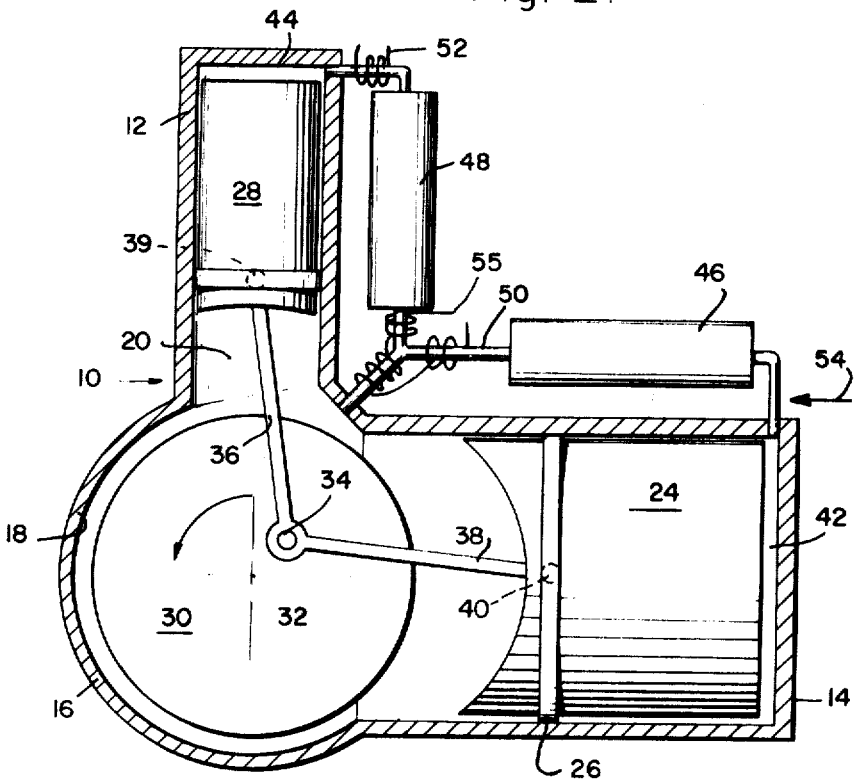

The invention relates to a cryogenic refrigerator adapted to produce extremely low temperatures required for efficient operation of certain electronic devices and amenable to miniaturization, simplified construction, and long service life.

A conventional type of closed-cycle cryogenic refrigerator employs a plurality of cylinders arranged generally in angular relation, the respective cylinders having a hot displacer, a cooling displacer reciprocable in the respective cyclinders and defining, in the respective cylinders, a hot chamber and a cold chamber. Arrangements of this type characteristically incorporate a cool chamber at a temperature level between the temperature levels of hot and cold chambers. Passages interconnect the chambers and include regerenator means. The passages accommodate the transfer of refrigerating fluid between the chambers in response to displacer reciprocation. Characteristically, the regenerators are operative to absorb heat from excessively hot gases passing therethrough and return heat to relatively cool gases passing therethrough as the cyclic direction of gas flow is reversed.

As noted above, certain operating systems which require cryogenic cooling involve parameters wherein small size, efficient operation, low initial cost, and long service life are at a premium. Typical of such application is the cooling of electronic devices such as an infrared detector while the latter is being carried by a flying vehicle in, for example, orbital trajectory about the earth. Here the detecting device may be used to scan or otherwise "photograph" certain rediation patterns being emitted from the earth's surface or atmosphere and this contemplated use reasonably requires continued device operation over an extended period of time even, for example, for as long as one year or more.

Cryogenic refrigerators of prior art design characteristically employed rather complex connecting rod systems operatively associating the respective hot and cold displacers with a common crankshaft. Efficient operation requires a separate chamber, herein demoninated a cool chamber, intermediate the hot and cold chambers and this structure coupled with connecting rod and sealing arrangements dictated complicated, well-sealed, expensive structure having excessive weight and bulkiness; clearly, a disadvantage when used in a flight mode. One reason for such complicated structure is the necessity for having a power source to drive a common crankshaft and effect the required out-of-phase displacer movement necessary for the cyclic flow of the refrigerating gas and thereby producing the refrigerating effect. Device operation requires a heat input source at the hot cylinder and cyclic action of the refrigerating fluid as the displacer elements are moved within their respective cylinders by the power source, i.e., electric motor provided. This connects the input heat energy at one cylinder to refrigerating energy at the cooling cylinder.

*SUMMARY*

*In order to aid in the understanding of this invention, it can be stated in essentially summary form that it is directed to a closed cycle cryogenic refrigerator which has a hot cylinder, a cold cylinder and a work chamber in a sealed housing. Displacers are positioned in the cylinders to define chambers. Rotatable means in the work chamber has rods interconnected between the rotatable means and the displacers to reciprocate the displacers in out-of-phase relationship. Passages interconnect the chambers and have regenerators therein to permit circulation of fluid between the chambers, in accordance with displacer motion.*

It is an object of the present invention to provide a sealed closed-cycle cryogenic refrigerator of the type described readily adaptable to miniaturization and thus provide the refrigerating effect desired in a small-sized, low-weight, compact package.

It is a further feature of the invention to utilize the crankcase space, that is, that volume wherein the connecting or common crankshaft is rotatably positioned, as a cool or intermediate temperature chamber during the cycling sequence necessary to achieve the refrigerating effect.

It is yet another object of the invention to provide a refrigerating device of the type described which eliminates the necessity for chamber-defining walls of prior art designs and the consequent necessity of connecting rod sealing and complicated connecting linkage.

It is still another object of the invention to provide a cryogenic refrigerator of the type described of such simplified construction that mechanical breakdown possibility is substantially reduced and long service life results.

It is yet a further object of the invention to provide a cryogenic refrigerator of the type described wherein certain components of the operative structure are enclosed in a sealed housing to thereby avoid the entrance of contaminants which experience has shown interferes with long service life.

Still another object of the invention is an arrangement described wherein the sealed housing contains all of the refrigerating gas, in the major operating structural components of the refrigerator, while the motor windings, i.e., the stator which induces displacer motion are located externally of the housing and conventionally drive a related rotor through the housing wall to effect refrigerator operation.

Figure 2:
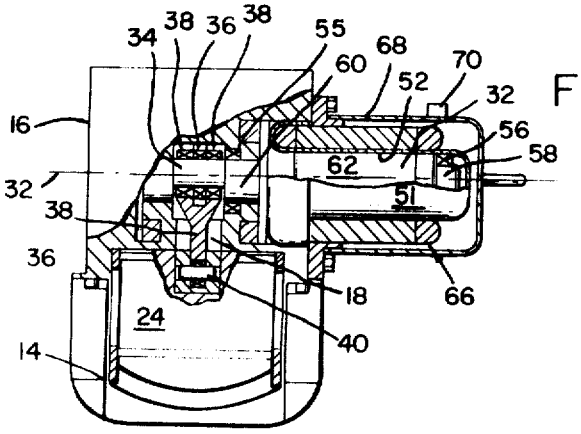

These and other features and advantages of the invention will become apparent in the course of the following description and from an examination of the related drawings wherein:

FIGURE 1 is a schematic, vertical, sectional, elevational view of a typical embodiment of the invention herein disclosed; and FIG. 2 is a partially fragmentary, elevational view of an embodiment of the refrigerator disclosed in FIG. 1 and illustrating the mode of motor construction in relation to the sealed housing.

Describing the invention in detail and directing attention to FIG. 1, the numeral 10 generally illustrates a sealed housing containing the refrigerator. The housing 10 is provided with a cold cylinder 12 at one aspect and a hot cylinder 14 at another aspect, said cylinders preferably being in 90° relation to each other as seen in FIG. 1. Interconnecting the cold cylinder 12 and hot cylinder 14 is a main housing 16, the latter defining a working volume or chamber 18 internally thereof. As will be seen, the working volume 18 is in direct communication with the inner portion 20 of the cold cylinder 12 and the inner portion 22 of the hot cylinder 14.

With this construction in mind, it will be apparent that a hot displacer 24 may be positioned in chamber 22 of cylinder 14 for reciprocal motion therein. An appropriate annular seal 26 may be provided.

Directing attention to cold cylinder 12, it will be seen that a cold displacer 28 is positioned within the chamber 20 defined by cylinder 12 and is also sealed as at 30 whereby the displacer may effect reciprocating motion within the cylinder 12.

Within working volume or chamber 18 a crankshaft 30 is positioned for rotatable motion about a central axis 32, the latter being perpendicular to the plane of FIG. 1. A crank pin or throw 34 is positioned eccentrically with reference to the axis of rotation 32 and serves as a journal for mounting the connecting rods 36 and 38, said rods pivotally interconnecting the throw 34 and the cooling displacer 28, and the throw 34 and the hot displacer 24, as is shown at 39 and 40, respectively.

The hot displacer 24 defines with cylinder 14 a hot chamber 42. Similarly, the cooling displacer 28 defines with cylinder 12 a cold chamber 44. Intermediate the chambers 42 and 44, the main housing 16 and the chamber 18 defines a cool chamber surrounding the crankshaft 30 and extending partially into the respective cylinders 12 and 14.

It will also be noted that all of the chamber volumes of the miniaturized cryogenic refrigerator 10 are in communication via first regenerator 46, second regenerator 48, and connecting central piping 50, the latter establishing communication between the regenerators and the cool chamber 18. A heat load 52 is provided adjacent the cold cylinder 12. That heat load may be an electronic detector or the like which must be cooled to a cryogenic temperature as a result of refrigeration developed at the cylinder 12. To provide heat input to the device 10, a heat source 54, which may be an open flame but is here shown by an arrow, is in heat exchange relation with the hot chamber 42 of cylinder 14. The heat source 54 may be at any relatively high temperature as, for example, 1000° F. and may continuously supply heat to the chamber 42 during operation. A heat exchanger 55 may be provided in association with the piping 50 to reject heat to ambient from the passing refrigerating fluid.

[Considering briefly the operation of the structure, the crank throw 34 may be assumed to be in the upwardly directed position (FIG. 1) indicating the displacer 28 is at top-dead-center in cylinder 12 while the displacer 24 is in an intermediate position in cylinder 14. When the crank throw moves 90° to the leftwardly-directed position of FIG. 1, the cold displacer 28 moves to central position and the hot displacer 24 moves to bottom-dead-center. Refrigerating fluid moves from chamber 18 to chambers 42 and 44 and the expansion phase of the cycle is being achieved. Refrigeration is produced at cylinder 44. Refrigerating fluid moving to chamber 44 is, of course, cooled by passage through regenerator 48 and fluid then heated by passage through regenerator 46. At exchanger 55 heat is discharged to ambient. Continued movement of throw 34 to downwardly directed position of FIG. 1 brings displacer 28 to bottom-dead-center and displacer 24 to intermediate position. The expansion or refrigerating phase of the cycle is thus completed and pressure in the arrangement minimized.

As the crank throw 34 moves to the rightwardly-directed position, the hot displacer 24 is brought to top-dead-center while the cold displacer 28 moves to an intermediate position. Both displacers are compressing the refrigerating fluid and pressure in the system is increased.

On a return of the crank throw 34 to the upwardly-directed position, the cold displacer 28 is moved to top-dead-center and the hot displacer 24 is moved to an intermediate position to thus arrive at the initiation point of the refrigerating phase of the cycle.

The net effect of a complete cycle of operation is that heat energy is supplied from source 54 to chamber 42 and the work equivalent thereof is delivered as refregeration at the cold cylinder 12.]

*The refrigerator is a constant volume device. The total volume of the cold chamber, the hot chamber and the cool chamber or working volume 18 is constant. However, the volume is divided in different fractions, depending upon the positions of the pistons. In spite of the fact that the motion of the two pistons cannot vary the total volume, pressure varies as the pistons move because of changes in the average temperature of the gas that fills the total volume. Considering the pistons individually, as the hot piston 24 moves toward the crankshaft, it forces gas from the cool work chamber 18, which is at ambient temperature, to the hot side of hot piston 24, which is hot chamber 42. Since this movement causes an increase in the average temperature of the gas in these two portions of the total volume, the average pressure in the entire refrigerator increases. Likewise, as the cooling piston 28 moves toward the crankshaft, it forces some of the gas from the cool working chamber 18 to the cold end of piston 28, or cold chamber 44. As the gases thus cool, the pressure decreases. Thus, motion of power piston 24 toward the crankshaft causes the gas to expand. Each motion is reversible.*

*In operation the crankshaft 30 rotates in a counterclockwise direction and assuming the crank throw 34 to be at the top, the piston 28 is at top-dead-center in cylinder 12 while the piston 24 is in an intermediate position in the cylinder 14. When the crank throw 34 moves 90° to its left-most position the cold piston 28 moves to central position and the hot piston 24 moves to bottom-dead-center. While moving through this quadrant, both pistons are moving toward the center line of the crankshaft. As previously discussed, motion in this direction by the hot piston 24 causes compression and motion in this direction by cooling piston 28 causes expansion. These actions are essentially balanced and the pressure does not change. The net effect is that a certain amount of the working gas is transferred to the cold end of the cooling cylinder 12 without undergoing any change in pressure. Further movement of the throw 34 to the bottom brings the piston 28 to bottom-dead-center and the piston 24 to an intermediate position. During crank motion through this quadrant, hot piston 24 is moving away from the crank axis while cooling piston 28 is moving toward the crank axis. As previously discussed, motion of the pistons in this direction both cause expansion of the gas and the pressure falls from a substantially constant high value to a new substantially constant low value. This is the refrigeration aspect of gas expansion in cold chamber 44.*

*As the crank throw 34 moves to the righet-most position, the hot piston 24 is brought to its top-dead-center, while the cold piston 28 moves to an intermediate position. During this step, the cooling piston 28 compresses the gas and the hot piston 24 expands it, substantially without affecting the pressure. Thus, the pressure remains substantially at the low value, and gas is transferred at substantially constant pressure.*

*On a return of the crank throw 34 to the top, the cold piston 28 is moved to top-dead-center and the hot piston 24 is moved to an intermediate position to thus arrive at the initiation point of the refrigeratiing phase of the cycle. This motion causes both pistons to compress the gas and the pressure again returns to the higher value.*

*Pressure-volume indicator cards for each of the chambers 42 and 44 show that the amount of work that has been done by the gas in the cold cylinder on piston 28 exactly matches the amount of work that has been supplied to the gas in the hot chamber. Since the mechanical P-V work of the pistons 24 and 28 acting upon the gas in the two chambers is coupled and is equal, thermodynamic heat addition at 54 to the hot chamber causes an equal thermodynamic extraction, or cooling at 52.*

In this somewhat schematic view of FIG. 1, it will be particularly noted that the working volume or cool chamber 18 is the volume wherein the crankshaft 34 journally moves. There are no walls separating the working volume 18 from the displacers 24 and 28 and direct connecting rods 36 and 38 may couple the crank throw 34 and the respective displacers 24 and 28. Complicated sealing is not required. This structure complements miniaturization (low weight), efficient operation, and long service life due to elimination of many sources of possible structural failure.

FIG. 2 is an illustrative view of another feature of the invention which contributes importantly to miniaturization and light weight, complements the sealed closed-cycle system, and thereby contributes to long service life of the refrigerator. Certain aspects of FIG. 2 are identical with FIG. 1 and where identity exists identical numerals will be used.

The hot cylinder of FIG. 2 is shown at 14 in partially broken fragmentary view having the hot displacer 24 disposed therein. The crankshaft or main housing is indicated at 16, as in FIG. 1, and defines internally thereof the cool chamber 18. Structure defining the cold cylinder 12 and related parts is not shown in this figure because in normal construction it would be perpendicular and behind the plane of the page illustrating the structure. The center of rotation of the crankshaft is shown at 32, as in FIG. 1, and the center line of the eccentric crank throw is shown at 34. Rod 38 is journalled to crank throw 34 and is pin-connected as at 40 to the displacer 24. The crank-connecting rod 36, normally attached to the cool displacer 28, is illustrated but its connection to that displacer is not shown.

It will be recalled that the refrigerator here under discussion is a closed and sealed arrangement, the integrity of that sealing being intended to be preserved during the entire operating life of the refrigerator. This avoids the introduction of contaminants into the refrigerating fluid which could have deleterious effect on machine service life as well as machine efficiency during operation. Accordingly, the housing 16 is provided with a connected wall which projects to the right of said housing as seen in FIG. 2. This wall is indicated by the numeral 50. The wall defines internally thereof the cavity 52 which communicates with the internal aspects of the refrigerator and partially seals said internal aspects from communication with ambient. The wall 50 is cylindrical. A pair of spaced bearings 55 and 56 are mounted in the cavity 51 and chamber 18 respectively and journally support bosses 58 and 60 which are integrally formed with a rotor 62 of a conventional electric motor. Note particularly the bosses 58 and 60 are journalled for rotation about axis 32. Projecting from the boss 60 is an eccentric crank throw 63 which, upon rotation of the rotor 62, provides the driving mode for the connecting rods 36 and 38 and the connected displacers 24 and 28. The throw 63 is identical in function with the throw 34 of FIG. 1. In order to drive the rotor 36, the motor-stator, here shown generally at 66, is positioned peripherally around the wall 50, the latter being interposed between the stator 66 and rotor 62. A covering housing 68 may be conventionally bolted to housing 16 and may be provided with an electrical connection 70 to provide appropriate electrical power to the stator 66. Upon appropriate connection, the electrical fields generated in the stator 66 induce rotation of the rotor 62 and provide the rotative power to induce the displacer motion earlier described which completes the refrigerating cycle. It is noted that a particular advantage of this structure is that contaminants normally associated with insulation and sealing of stator windings are shielded from the sealed internal portions of the refrigerator, thus avoiding contamination thereof and contributing to service life. Further, motor-stator service is readily accomplished by removal of housing 68 without the necessity of machine disassembly.

From the succinct description given above, it will be apparent to those familiar with the cryogenic refrigeration field that an appropriate refrigerating structure is provided readily adapted to miniaturization and having physical features which eliminate structure characteristic of added weight and mechanical failure in prior art devices. Modern service requirements which demand minimal weight, efficient operation, and long service life without maintenance are thus met.

The invention is disclosed by way of illustration and not limitation and may be modified in many particulars all within the scope and spirit thereof.

What is claimed is:

1. In a cryogenic refrigerator to produce refrigeration by closed cycle circulation of a cryogenic fluid, the combination of:

a sealed housing;

said housing having a hot cylinder, a cold cylinder, and a work chamber therein;

a hot displacer in the hot cylinder having a first surface defining with the cylinder a hot chamber;

a cold displaced in the cold cylinder having a first surface defining with the cylinder a cold chamber;

other surfaces on the respective displacers in direct facing communication with the working chamber;

rotatable means in the work chamber having rod means pivotally connecting the rotatable means with the respective displacers whereby upon rotation of the rotatable means the displacers reciprocate in their respective cylinders in out-of-phase relationship;

and circulation means comprising passage means having regenerator means therein interconnecting a hot chamber, the working chamber and the cold chamber whereby reciprocation of the displacers induces circulation of the fluid between said chambers.

2. A cryogenic regrigerator according to claim 1, and including means to dissipate heat to atmosphere at the approximate point of communication of the passage-means with the working chamber.

3. A cryogenic refrigerator according to claim 2, wherein said rotatable means comprises a rotor, said rotor being disposed within the sealed housing, and stator means to create electrical field means to indue motor rotation, said stator means being operationally associated with the rotor and positioned externally of the housing.

4. In a cryogenic refrigerator to produce refrigeration by closed cycle circulation of a cryogenic fluid, the combination of:

a sealed housing defining a hot chamber, a cold chamber, and an intermediate working chamber;

all of said chambers being in direct communication with each other;

a hot displacer in the hot chamber for reciprocating movement therein and providing the sole means of demarcation between a hot volume in the hot chamber and a cool volume in the working chamber;

a cold displacer in the cold chamber for reciprocation therein and providing the sole means of demarcation between a cold volume in the cold chamber and the cool volume of the working chamber;

first passage means establishing communication between the hot volume in the hot chamber and the cool volume in the working chamber;

other passage means establishing communication between the cold volume of the cold chamber and the cool volume of the working chamber;

independent regenerator means in the respective passage means;

the respective passage means being in joined communication adjacent the point of entry of the passage means to the cool volume of the working chamber, crank means located in the working chamber and having connection means to the respective displacers whereupon rotation of the crank means induces reciprocation of the respective displacers in out-of-phase relationship, and means to controllably induce rotation of the crank means.

5. A cryogenic refrigerator according to claim 4, wherein said last-mentioned means comprises electric motor means, said motor means having stator windings externally of the sealed housing, said crank means including electric rotor means operatively associated with the stator means and disposed within the sealed housing, said sealed housing being physically interposed between the stator means and the rotor means.

6. In a cryogenic regrigerator to produce refrigeration by closed-cycle circulation of a cryogenic fluid, the combination of a sealed housing defining a hot cylinder and a cold cylinder, said housing further defining a working chamber operatively intermediate the cylinders, displacer elements within the respective cylinders defining, respectively, a hot chamber in one cylinder and a cold chamber in the other cylinder, crank means operatively connected to the respective displacers to produce out-of-phase reciprocation thereof upon rotation of the crank means, said crank means comprising the rotor of an electric motor journalled for rotation within the sealed housing, and a stator for the electric motor positioned externally of the housing and operatively associated with the rotor to controllably induce rotation thereof.

References Cited

The following references, cited by the Examiner, are of record in the patented file of this patent or the original patent.

UNITED STATES PATENTS

| | | | |
|---|---|---|---|
| 3,074,244 | 1/1963 | Molaker | 62—6 |
| 3,128,605 | 4/1964 | Molaker | 62—6 |
| 3,145,527 | 8/1964 | Morgenroth | 62—6 |
| 3,147,600 | 9/1964 | Molaker | 62—6 |
| 3,355,882 | 12/1967 | Kohler | 62—6 |

FOREIGN PATENTS

| | | | |
|---|---|---|---|
| 913,290 | 6/1954 | Germany | 62—6 |
| 1,013,671 | 8/1957 | Germany | 62—6 |

WILLIAM J. WYE, Primary Examiner